(No Model.)
D. S. MUNGER & C. E. PRICE.
HORSE CHECKING DEVICE.
No. 387,175. Patented July 31, 1888.
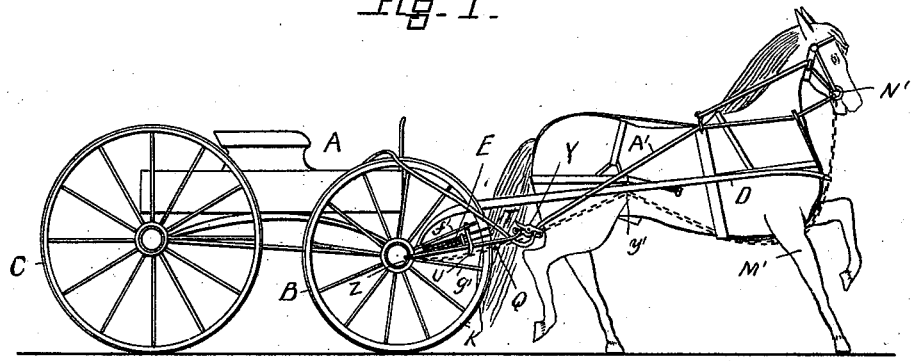
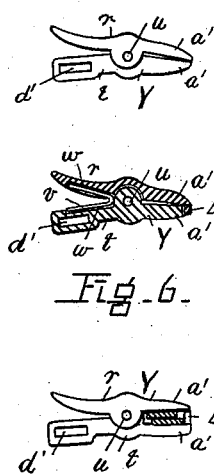
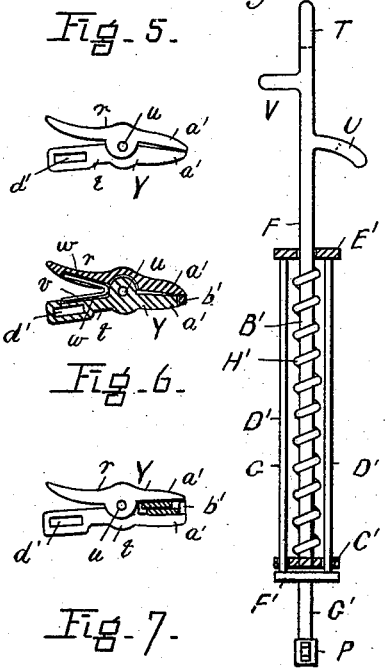
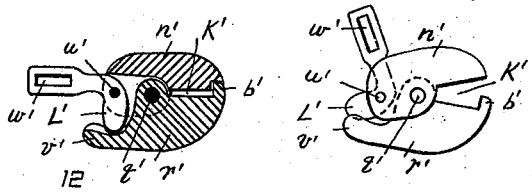
WITNESSES:
Percy Bryant
C. E. Nichols
INVENTORS
Dexter S. Munger
Cyrus E. Price
per Edwin W. Brown
Attorney

UNITED STATES PATENT OFFICE.

DEXTER S. MUNGER AND CYRUS E. PRICE, OF STONEHAM, MASSACHUSETTS.

HORSE-CHECKING DEVICE.

SPECIFICATION forming part of Letters Patent No. 387,175, dated July 31, 1888.

Application filed December 22, 1887. Serial No. 258,710. (No model.)

*To all whom it may concern:*

Be it known that we, DEXTER S. MUNGER and CYRUS E. PRICE, of Stoneham, in the county of Middlesex and State of Massachusetts, have invented certain new and useful Improvements in Horse-Checking Devices, of which the following is a full, clear, and exact description.

This invention relates to a device for checking a horse when attached to a vehicle, to prevent his running away; and the invention consists, in combination with a wheel of a vehicle, of a device adapted to be placed over and engage with the tire or rim of the wheel, and to also engage with the hub, having a check-rein attached thereto, which is adapted to be attached or connected to the driving-reins, or to be attached or connected directly to the bit or bridle of the horse, so that if the horse attempts to move or run away with this checking device attached to the wheel of the vehicle and the horse, as hereinafter described, the horse will be stopped and prevented from running away, all substantially as hereinafter fully described, reference being had to the accompanying plate of drawings, in which—

Figure 1 is a side view of a horse and buggy having this horse-checking device attached thereto, and showing its mode of operation; Figs. 2 and 3, respective side views, at right angles to each other, of the checking device; Fig. 4, a detail plan view and cross-section on line 4 4, Fig. 3; Figs. 5 and 7, side views, and Fig. 6 a longitudinal section, of a device for connecting the check-rein to the driving-reins or to the bridle or bit; Figs. 8 and 9, respectively, longitudinal section and side view of a modification of the device shown in Figs. 5 to 7; Fig. 10, a view of the checking device similar to Fig. 2, but showing a modification in its construction. Figs. 11 and 12 show a modification of the manner of attaching or connecting the checking device to the wheel-hub.

In the drawings, A represents in side view an open buggy with a horse attached thereto, B C its wheels, and D the shaft, all constructed in the usual manner, and having the present hitching or checking device E applied thereto and showing its mode of operation. This hitching or checking device E is made substantially in two parts, F and G, as follows: The part F is constructed of a piece of wire doubled or folded upon itself, as at H, so as to have its two straight portions J a short distance apart and parallel with each other, as shown in Fig. 2, and its folded end H is bent over sidewise at right angles, as at $a$, to the straight portions J, and then bent down, as at $b$, Figs. 2 and 3, so it can be placed over and clasp the rim or tire K of a wheel of a vehicle, as shown in Fig. 3. The ends $d\,d$ of the wire extend through and are riveted to a cross piece or head, L, or secured thereto in any suitable manner. The other part, G, consists substantially of a wire or rod, M, between the two straight parallel portions, J, of the part F, and passing through a socket, $e$, in the cross-piece L, so it can freely move back and forth therein, its upper end being riveted or rigidly attached to a cross-bar, N, adapted by a socket, $f$, in each end to slide freely back and forth along and over the straight portions J of the part F. The lower end of the rod M is secured to a cross head or arm, P, between its two ends, one end of which has a shoulder, $g$, to which is adapted to be attached a leather strap or rein, Q, by its eye or opening $h$, and the other portion, R, having its upper surface transversely grooved or serrated, as at $m$. (Shown in Fig. 3.)

S is a cross-arm rigidly secured to the two portions J of the part F below the clasp T and extending laterally therefrom each way, as shown in Fig. 3, forming at the right an arm, U, which bends forward slightly horizontally and downwardly, and at the left an arm, V, which bends horizontally forward in a curved line, as shown in Fig. 4 more particularly.

W is a spiral spring encircling the rod M, and adapted to bear against its cross-bar N and bar L of the part F, its tension serving to keep the rod M up in the position shown in Figs. 2 and 3, its cross-bar N abutting against the cross-arm S, the spring W allowing the rod M to be moved along its bearings on the rods J when desirous of lengthening the device at any time.

Attached by a loop, $n$, to the other end of the strap Q is a clamp, Y, made in two parts, $r\,t$, hinged together at $u$, and having a bent spring, $v$, placed in recesses $w$ in the contiguous sides of the two parts, as shown in Fig. 6 more particularly, which spring by its tension acts to keep the two arms $a'$ closed upon each other, and so that if anything is placed between the two arms, as shown in Fig. 7, it will be firmly held between them and prevented from movement therein or escape therefrom, one of the arms having a side projecting portion, b', on its end as an additional preventive from escape of anything therefrom. The part t has an opening or eye, d', for the reception of the loop u of the strap R.

The manner of operation of this hitching device is substantially as follows: When desirous of preventing the horse from moving or running away when left alone, the device by its arm, R, is placed inside of the hub Z of the wheel B for the serrated side m to bear against the inner side of the hub, as shown in dotted lines in Fig. 3, and the clasp or clip T of the part F placed over the rim K of the wheel, as shown in Fig. 3 more particularly, the two parts F G being pulled from each other longitudinally against their spring W sufficiently for the purpose. When so placed, the tension of the spring serves to maintain the connection of the device between the hub and wheel-rim. The arm V of the clasp T being placed between the two spokes f' g' of the wheel at such place, the spring-clamp Y is then opened and the driving-reins A' placed therein, between its two arms a', as shown in section in Fig. 7, and the arms allowed to close thereon, the strap Q and reins A' being preferably somewhat loose.

If the horse starts or attempts to move or run away, as he pulls the buggy along, the wheel revolving to the right, the next spoke, f', above or to the left of the arm V of the clasp will abut against such arm, as shown in Fig. 4, and in the continued rotation of the wheel the hitching device will be carried with it, swinging on its connection with the hub, until its other arm V will bear against the strap Q, and, pressing it down, draw it and the driving-reins A' tight, pulling upon the bit of the horse, and thus check and hold the horse, all as shown in Fig. 1. If the horse should then back, the device would be partially raised by the backward turn of the wheel, relieving the strain upon the strap Q and reins A' and horse, and if the horse should again move forward the device would again move down and engage with and tighten and pull upon the driving-reins and check him as before. Thus by the device pulling tightly upon the reins the horse would be checked and prevented from running away.

In Fig. 10 is shown a modification in the construction of the device. The clasp T is on the end of a single wire or rod, B', rigidly secured by its other end to a cross-bar, C', adapted to slide or move up and down on two parallel rods, D', connected and rigidly secured by their ends to cross-bars E' F', respectively, the cross-bar F' having a rod, G', projecting therefrom, which has an arm, P, similar to the rod M in Figs. 2 and 3.

A spiral spring, H', encircles the rod B' and bears against the cross-bar C' of the rod and the cross-bar E' on the rods D', which keeps the two parts together when not otherwise pulled apart, and also serves to hold the device to the wheel when attached in the same manner as the spring W operates on the device shown in the other figures.

In Figs. 8 and 9 is shown a modification of the driving-rein-clamping device Y', the two parts n' r' being pivoted together at t', and the driving-reins being placed in the opening K' between the two parts. A cam, L', is pivoted at u' to one of the parts, as shown in the figures, which, swung in the proper direction, abuts against the arm v' and swings the two outer arms in a direction to close them together and firmly hold whatever is placed between them.

Swinging the cam L' in the reverse direction allows the two arms n' r' to be opened from each other, so that the reins can be placed in the opening between them. The arm of the cam L' has an eye, w', for its attachment to the strap Q, and when the clamp is attached to the driving-reins A' and the reins drawn tight the harder the pull upon the clamp the firmer its arms will clasp the reins A'.

This device can be attached to the hub in any suitable manner; also, if desired, the strap Q can be long enough to be attached directly to the bit or bridle of the horse, as shown in dotted lines in Fig. 1, where the strap leads from the checking device and passes through a loop, y', on the shaft D, and then under the fore leg, M', of the horse, and is connected to the bit N', dispensing with using the driving-reins.

When not using the checking device, it can be removed from the wheel and placed in the buggy or wagon ready for use.

In attaching the lengthened strap Q to the bit, in lieu of the driving-reins, it can be attached by the spring-clamp, or by a common spring-snap, or by any suitable hook, &c.

By making the part F of bent wire, as shown, it makes a broad hook part or clasp, T, which steadies the device attachment to the wheel, as it presents a broader surface than of one wire, as shown in Fig. 10.

The strap Q can be secured to the end of the rod M in any suitable manner.

The several parts are preferably made of metal, and can be of any suitable shape in cross-section. The strap, however, is made of leather or any suitable flexible material.

In Figs. 11 and 12 is shown the manner of attaching the checking device E to the hub of a wheel that is solid on its outer end or has a cap thereon, such hub being shown in dotted lines in Fig. 12. In these views, P' is a rim or flange adapted to fit closely over the end of the hub, as shown, and connected to a central piece, $a^2$, by arms $b^2$, which central piece, $a^2$, is connected to the end of the rod M, preferably, so it can swivel thereon.

Having thus described our invention, what we claim is—

1. A checking device for horses, composed of two parts, one an arm or rod having one end suitably constructed to be applied over the rim of a wheel and provided with two laterally oppositely-projecting arms, U V, and connected by sliding joints to the other part, which consists of a rod or arm adapted to be attached to the hub of the wheel, and provided with a strap or rein adapted to be attached to the driving-reins or the bit or bridle of the horse, for the purpose specified.

2. A checking device for horses, composed of two parts, one an arm or rod having one end suitably constructed to be applied over the rim of a wheel and provided with two laterally oppositely-projecting arms, U V, and connected by sliding joints to the other part, which consists of a rod or arm having a laterally-projecting arm, R, for attaching it to the hub of the wheel, and provided with a strap or rein adapted to be attached to the driving-reins or to the bit or bridle of the horse, for the purpose specified.

3. A device for checking horses, composed of two parts, one an arm or rod having one end suitably constructed to be applied over the rim or tire of a wheel, and provided with two laterally oppositely-projecting arms, U V, and connected by sliding joints controlled by a spring to the other part, which consists of a rod or arm having a laterally-projecting arm, R, for attachment to the hub of the wheel, and adapted to receive the end of a strap or rein having a clamp for its connection with the driving-reins or bit or bridle of the horse, for the purpose specified.

4. A device for checking horses, composed of two parts, F G, one a wire folded upon itself, and having a clamp end, T, for attachment over the rim of a wheel and carrying two laterally oppositely-projecting arms, U V, its two ends secured to a cross-bar, L, through which cross bar or rod or arm of the part G is adapted to move back and forth, one of its ends adapted to be secured to the hub of the wheel, and having a strap, &c., secured thereto, and its other end attached to a cross-bar, N, adapted to slide on the parallel portions of the part F, and having a spiral spring, W, substantially as and for the purpose specified.

5. A checking device for horses, composed of two parts, one an arm or rod having one end suitably constructed to be applied over the rim of a wheel, and provided with two laterally oppositely-projecting arms, U V, and connected by sliding joints to the other part, which consists of a rod or arm adapted to be attached to the hub of the wheel, and provided with a strap or rein having secured thereto a clamp, Y, formed of two parts, r and t, pivoted to each other and provided with a spring, v, for attachment to the driving-reins or bit or bridle of the horse, for the purpose specified.

In testimony whereof we have hereunto set our hands in the presence of two subscribing witnesses.

DEXTER S. MUNGER.
CYRUS E. PRICE.

Witnesses:
EDWIN W. BROWN,
PERCY BRYANT.